(12) United States Patent
Chaney

(10) Patent No.: US 10,312,483 B2
(45) Date of Patent: Jun. 4, 2019

(54) DOUBLE LOCKING MECHANISM ON A BATTERY LATCH

(71) Applicant: Hand Held Products, Inc., Fort Mill, SC (US)

(72) Inventor: David E. Chaney, Lincolnton, NC (US)

(73) Assignee: Hand Held Products, Inc., Fort Mill, SC (US)

(*) Notice: Subject to any disclaimer, the term of this patent is extended or adjusted under 35 U.S.C. 154(b) by 296 days.

(21) Appl. No.: 14/870,153

(22) Filed: Sep. 30, 2015

(65) Prior Publication Data

US 2017/0092908 A1    Mar. 30, 2017

(51) Int. Cl.
*H01M 2/10* (2006.01)

(52) U.S. Cl.
CPC ...... *H01M 2/1066* (2013.01); *H01M 2220/30* (2013.01)

(58) Field of Classification Search
CPC .................................................. H01M 2/1066
See application file for complete search history.

(56) References Cited

U.S. PATENT DOCUMENTS

| | | | |
|---|---|---|---|
| 5,578,392 A * | 11/1996 | Kawamura | H01M 2/105 429/123 |
| 6,737,192 B2 * | 5/2004 | Yabuki | H01M 2/305 429/175 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |

(Continued)

FOREIGN PATENT DOCUMENTS

| | | |
|---|---|---|
| EP | 1585290 A2 | 10/2005 |
| WO | 2004089490 A1 | 10/2004 |

(Continued)

OTHER PUBLICATIONS

U.S. Appl. No. 13/367,978, filed Feb. 7, 2012, (Feng et al.); now abandoned.

(Continued)

*Primary Examiner* — Helen Oi K Conley
(74) *Attorney, Agent, or Firm* — Additon, Higgins & Pendleton, P.A.

(57) ABSTRACT

A double locking battery latch typically includes a fixed end having a fastening portion, a free end opposite the fixed end having a cover contacting latch, and a battery contacting latch positioned between the fastening portion and the cover contacting latch. The double locking battery latch may include a fasting portion which extends in a first plane. The double locking batter latch may also include a first transition extending continuously from the fastening portion to the battery contacting latch.

20 Claims, 4 Drawing Sheets

(56) References Cited

U.S. PATENT DOCUMENTS

| | | |
|---|---|---|
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |

(56) References Cited

U.S. PATENT DOCUMENTS

| | | |
|---|---|---|
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0183174 A1 | 7/2011 | Ouyang |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |

(56) References Cited

U.S. PATENT DOCUMENTS

| | | |
|---|---|---|
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

(56) References Cited

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch For a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.

\* cited by examiner

DOUBLE LOCKING MECHANISM ON A BATTERY LATCH

FIELD OF THE INVENTION

The invention is generally related to a battery latch for a mobile device, and, more specifically, to a battery latch having a double locking mechanism.

BACKGROUND

The current trend in mobile device design, such as cellular phones, tablets, digital cameras, etc., is towards increasingly smaller footprints. To accomplish this goal, smaller internal hardware components are regularly being designed and incorporated into progressively smaller a device housings. Additionally, the device housings themselves are being designed from increasingly thinner and lighter materials. One of the direct consequences of these thinner and lighter materials is that conventional battery and battery cover latching mechanisms are often inadequate for retaining a battery in the mobile device. The weight of the battery often exceeds the ability of the battery latching mechanism to retain the battery in the mobile device, with the result being that the weight of the battery forces a battery cover off of the device housing, and that the battery is dislodged from the device housing under a relatively low external shock force. Not only is this a significant inconvenience to a user, but this can also lead to damage to the device itself, or to the battery.

SUMMARY

In one aspect, the present invention embraces a double locking battery latch that includes a fixed end having a fastening portion, an opposite free end having cover contacting latch, and a battery contacting latch positioned between the fastening portion and the cover contacting latch.

In an exemplary embodiment, the fastening portion extends approximately in a first plane.

In another exemplary embodiment, the double locking battery latch includes a first transition extending continuously from the fastening portion to the battery contacting latch.

In yet another exemplary embodiment, the first transition bends from the fastening portion and extends approximately in a second plane that is orthogonal to the first plane.

In yet another exemplary embodiment, the battery contacting latch bends from the first transition and extends in a third plane that is approximately parallel to the first plane.

In yet another exemplary embodiment, the fastening portion has a battery facing surface; and the battery contacting latch has an opposing first catch contacting surface facing the inner battery surface.

In yet another exemplary embodiment, the double locking battery latch includes a second transition extending continuously from the battery contacting latch to the cover contacting latch.

In yet another exemplary embodiment, the second transition bends from the battery contacting latch and extends away from the fastening portion.

In yet another exemplary embodiment, the cover contacting latch bends from the second transition to extend in a fourth plane that is approximately parallel to the first and third planes.

In yet another exemplary embodiment, the cover contacting latch bends to extend in a fifth plane that is approximately parallel to the second plane.

In yet another exemplary embodiment, the cover contacting latch is approximately L-shaped.

In yet another exemplary embodiment, the fastening portion has a fastener receiving passageway.

In yet another exemplary embodiment, the fastener receiving passageway is substantially cylindrical, and extends approximately perpendicular to the fastening portion.

In yet another exemplary embodiment, the fastener receiving passageway has a threaded inner surface.

In another aspect, the present invention embraces a double locking battery latching assembly that includes a device housing have a battery receiving space and a double locking battery latch positioned in the battery receiving space and having: a fixed end with a fastening portion; an opposite free end with cover contacting latch; and a battery contacting latch positioned between the fastening portion and the cover contacting latch.

In an exemplary embodiment, the double locking battery latch assembly includes a battery positioned in the battery receiving space, and having a protruding catch engaged with the battery contacting latch.

In another exemplary embodiment, the double locking battery latch assembly includes a cover positioned over the battery receiving space, and having a blocking protrusion extending into the battery receiving space.

In yet another exemplary embodiment, the cover contacting latch is positioned between the battery and the blocking protrusion, and has a cover contacting surface in contact with the blocking protrusion.

In yet another aspect, the present invention embraces a battery latching method that includes the steps of: providing a device having a battery receiving space; positioning a double locking battery latch in the battery receiving space, the battery latch having a fixed end with a fastening portion, an opposite free end with cover contacting latch, and a battery contacting latch positioned between the fastening portion and the cover contacting latch; positioning a battery in the battery receiving space, the battery having a protruding catch; and engaging the battery contacting latch with the protruding catch to secure the battery in the battery receiving space.

In an exemplary embodiment, the battery latching method includes the step of positioning a cover over the battery receiving space, the cover having a blocking protrusion extending into the battery receiving space, and the cover contacting latch being positioned between the blocking protrusion and the battery.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The invention will now be described by way of example, with reference to the accompanying Figures, of which.

DETAILED DESCRIPTION

In the embodiments shown in FIGS. 1-5, a double locking battery latch 10 includes a fixed end 10a, a battery contacting latch 120, and a cover contacting latch 140.

Figure 1:
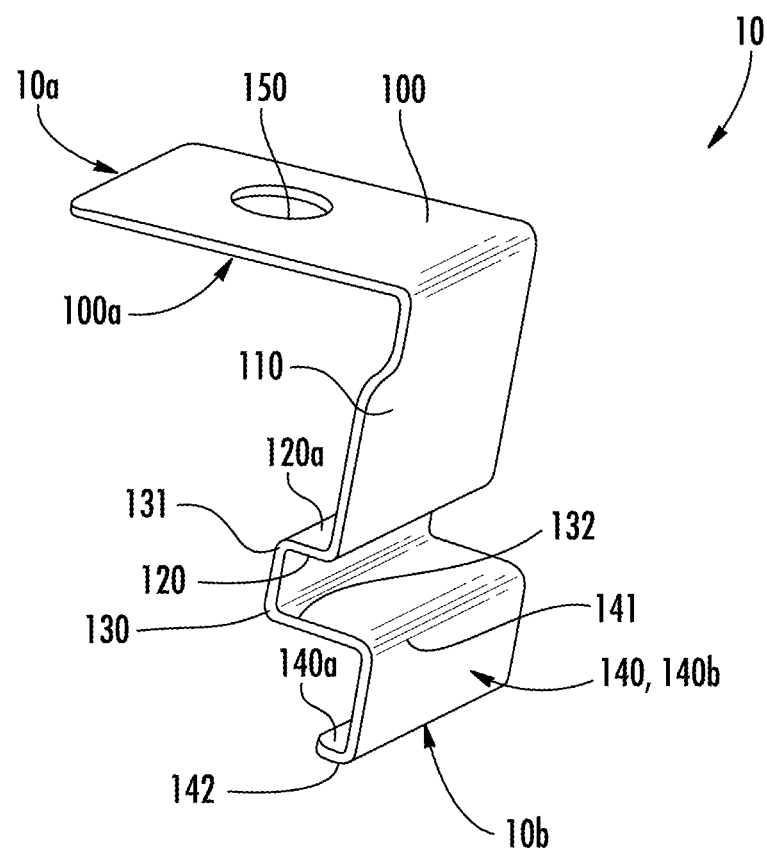
FIG. 1 is a perspective view of a double locking battery latch.

In an embodiment shown in FIG. 1, the battery latch 10 is cantilevered. The fixed end 10a has a fastening portion 100. The cover contacting latch 140 is positioned on a free end 10b opposite to the fixed end 10a. The battery contacting latch 120 is positioned between the fastening portion 100 and the cover contacting latch 140.

The fastening portion 100 extends approximately in a first plane. In an embodiment, the fastening portion 100 has a fastener receiving passageway 150. The fastener receiving passageway 150 is substantially cylindrical, and extends through the fastening portion 100, although those of ordinary skill in the art would appreciate that the shape of the fastener receiving passageway 150 can be other shapes, so long as the shape is complimentary to that of an inserted fastener 40. In an embodiment, the fastener receiving passageway 150 extends approximately perpendicular through the fastening portion 100. In an embodiment, the fastener receiving passageway 150 has a threaded inner surface.

A first transition 110 extends continuously from the fastening portion 100 to the battery contacting latch 120. In an embodiment, the first transition 110 bends from the fastening portion 100 and extends approximately in a second plane that is orthogonal to the first plane. In the embodiment, the second plane extends approximately 90° from the first plane.

In the embodiment shown in FIG. 1, the battery contacting latch 120 extends continuously from the first transition 110. The battery contacting latch 120 bends from the first transition 110 and extends in a third plane that is approximately parallel to the first plane. In an embodiment, the fastening portion 100, the first transition 110, and the battery contacting latch 120 together form an approximate U-shape. The fastening portion 100 has an inner battery facing surface 100a, and the battery contacting latch 120 has an opposing first catch contacting surface 120a facing the inner battery facing surface 100a.

In an embodiment, a second transition 130 extends continuously from the battery contacting latch 120 to the cover contacting latch 140. The second transition 130 firstly bends from the battery contacting latch 120 and extends a first distance in a direction away from the fastening portion 100. In an embodiment shown in FIG. 1, the first bend 131 of the second transition 130 is bent approximately 90°. In an embodiment shown in FIG. 4, the first bend 131 is bent approximately 45°. After extending the first distance, the second transition 130 then secondly bends in a direction opposite the first bend 131. In an embodiment shown in FIG. 1, the second bend 132 of the second transition 130 is bent approximately 90°. In an embodiment shown in FIG. 4, the second bend 132 is bent approximately 45°. In an embodiment of FIG. 1, the battery contacting latch 120, the first bend 131, the first distance, and the second bend 132 together form an approximate L-shape or U-shape. Those of ordinary skill in the art would appreciate that other shapes are also possible, as shown for example, in the embodiment of FIG. 4.

In an embodiment of FIG. 1, the cover contacting latch 140 extends continuously from the second bend 132 of the second transition 130 for a first distance in a fourth plane that is approximately parallel to the first and third planes. The cover contacting latch 140 then firstly bends 141 at approximately 90°, and extends a second distance in approximately the same direction as the first transition 110, away from the fastening portion 100. The second distance of the cover contacting latch 140 extends in a fifth plane that is approximately parallel to the second plane. The portion of the cover contacting latch 140 extending the second distance has an outward facing, cover contacting surface 140b.

Figure 2:
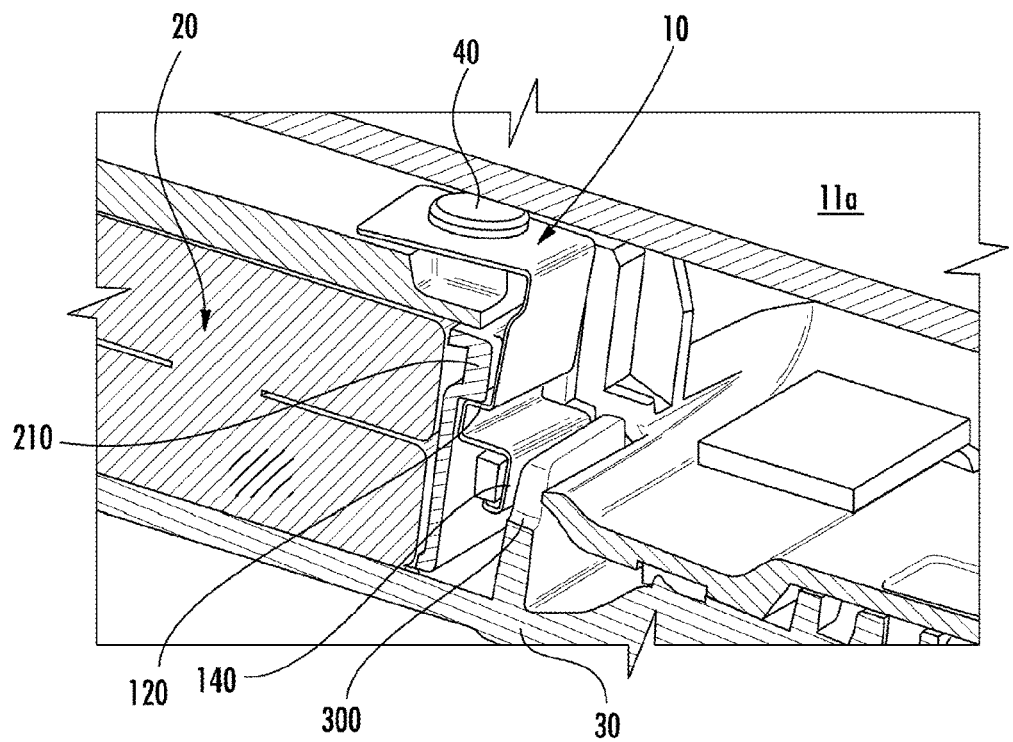
FIG. 2 is a partial cross-sectional view of a double locking battery latch assembly with the double locking battery latch.

In the embodiments shown in FIGS. 1 and 2, the cover contacting latch 140 then secondly bends to extend in a sixth plane that is approximately parallel to the first and/or third planes. The portion of the cover contacting latch 140 extending in the sixth plane has a second catch contacting surface 140a facing a portion of the cover contacting latch 140 extending in the fourth plane. The second bend 142 of the cover contacting latch 140 is bent approximately 90°, although in other embodiments, the second bend 142 may be approximately 45° or another angle. In an embodiment, the cover contacting latch 140 is approximately L-shaped or U-shaped, or J-shaped.

In another aspect of the invention, shown in the embodiments of FIGS. 1-5, a double locking battery latching assembly 500 includes an electronic device 11, a battery 20, the double locking battery latch 10, and a battery cover 30.

The electronic device 11 has a device housing 11a with a battery receiving space 11b. In an embodiment, one double locking battery latch 10 is positioned in the battery receiving space 11b. The fastening portion 100 is connected to the device housing 11a through a fastener 40 inserted through the fastener receiving passageway 150 and secured to a fastener receiving hole (not labeled) disposed in the device housing 11a. Those of ordinary skill in the art would appreciate that in another embodiment (not shown), two or more double locking battery latches 10 are positioned in the battery receiving space 11b. When there are two or more double locking battery latches 10, multiple latches 10 can be positioned along one side of the battery receiving space 11b, or can be positioned on opposite sides of the battery receiving space 11b.

In the embodiments shown in FIGS. 2-5, the battery 20 has a shape complimentary to the shape of the battery receiving space 11b, and is received therein. The battery 20 has a first protruding catch 210 extending outward from an outer surface. When the battery 20 is positioned in the battery receiving space 11b, the first protruding catch 210 engages with the battery contacting latch 120a such that the first protruding catch 210 rests on the first catch contacting surface 120a. As described above in an embodiment, the fastening portion 100, the first transition 110, and the battery contacting latch 120 together form an approximate U-shape. As shown in the embodiment of FIG. 2, when the first protruding catch 210 rests on the first catch contacting surface 120a, the fastening portion 100, the first transition 110, and the battery contacting latch 120 approximately wrap around the first protruding catch 210. When the device housing 11a is subject to a shock force, the first protruding catch 210 presses against the first catch contacting surface 120a, but the battery 20 is prevented from becoming dislodged out of the battery receiving space 11b by the battery contacting latch 120.

Figure 3:
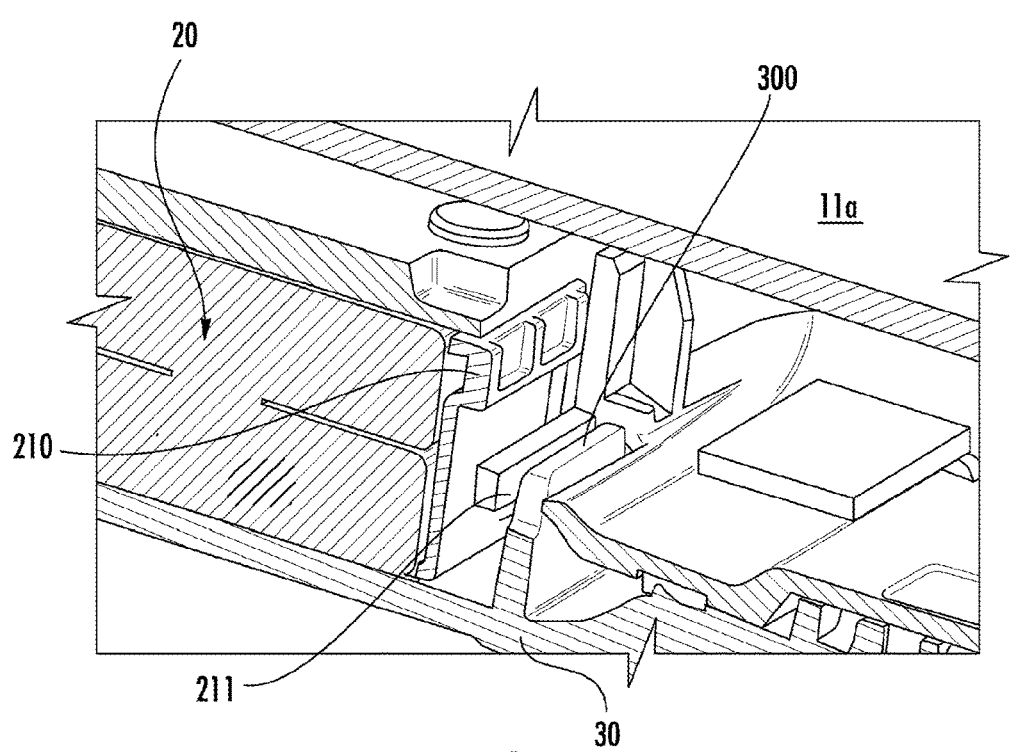
FIG. 3 is a partial cross-sectional view of the double locking battery latch assembly without the double locking battery latch.
Figure 4:
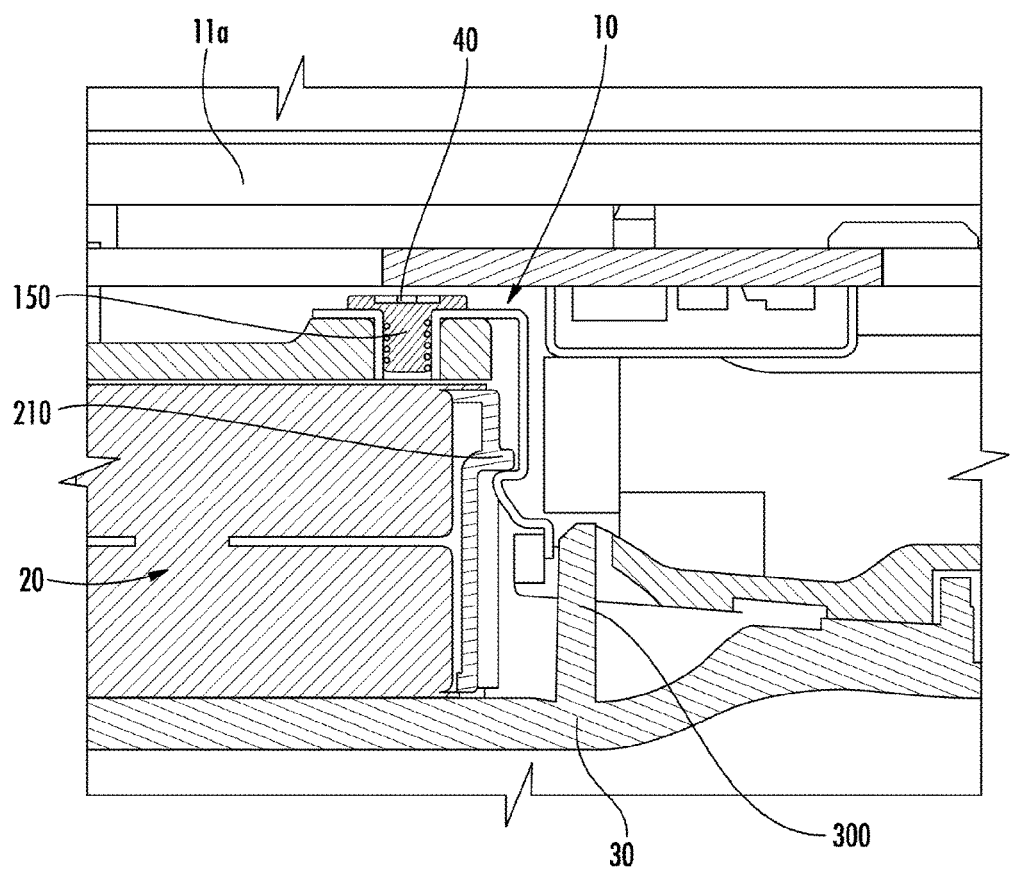
FIG. 4 is a cross-sectional view of the double locking battery latch assembly.

In the embodiments shown in FIGS. 2-4, the battery 20 has a second protruding catch 211 positioned on the same side of the battery 20 as the first protruding catch 210. The second protruding catch 211 extends approximately parallel to the first protruding catch 210, being spaced a distance therefrom. When the battery is positioned in the battery receiving space 11b, the second protruding catch 211 engages with the cover contacting latch 140 such that the second protruding catch 211 rests on the second catch contacting surface 140a. As described in the embodiments above, the cover contacting latch 140 has an approximate U-, L-, or J-shape. As shown in the embodiment of FIG. 2, when the second protruding catch 211 rests on the second catch contacting surface 140a, the cover contacting latch 140 approximately wraps around the second protruding catch 211. When the device housing 11a is subject to the shock force, the second protruding catch 211 presses against the second catch contacting surface 140a, but the battery 20 is prevented from becoming dislodged out of the battery receiving space 11b by the cover contacting latch 140.

In the embodiments shown in FIGS. 2 and 3, when the battery 20 is positioned in the battery receiving space 11b, the battery contacting latch 120 is engaged with the first protruding latch 210 and the cover contacting latch 140 is engaged with second protruding catch 211. Thusly, the battery 20 is retained in the battery receiving space 11b by the double locking battery latch 10.

Figure 5:
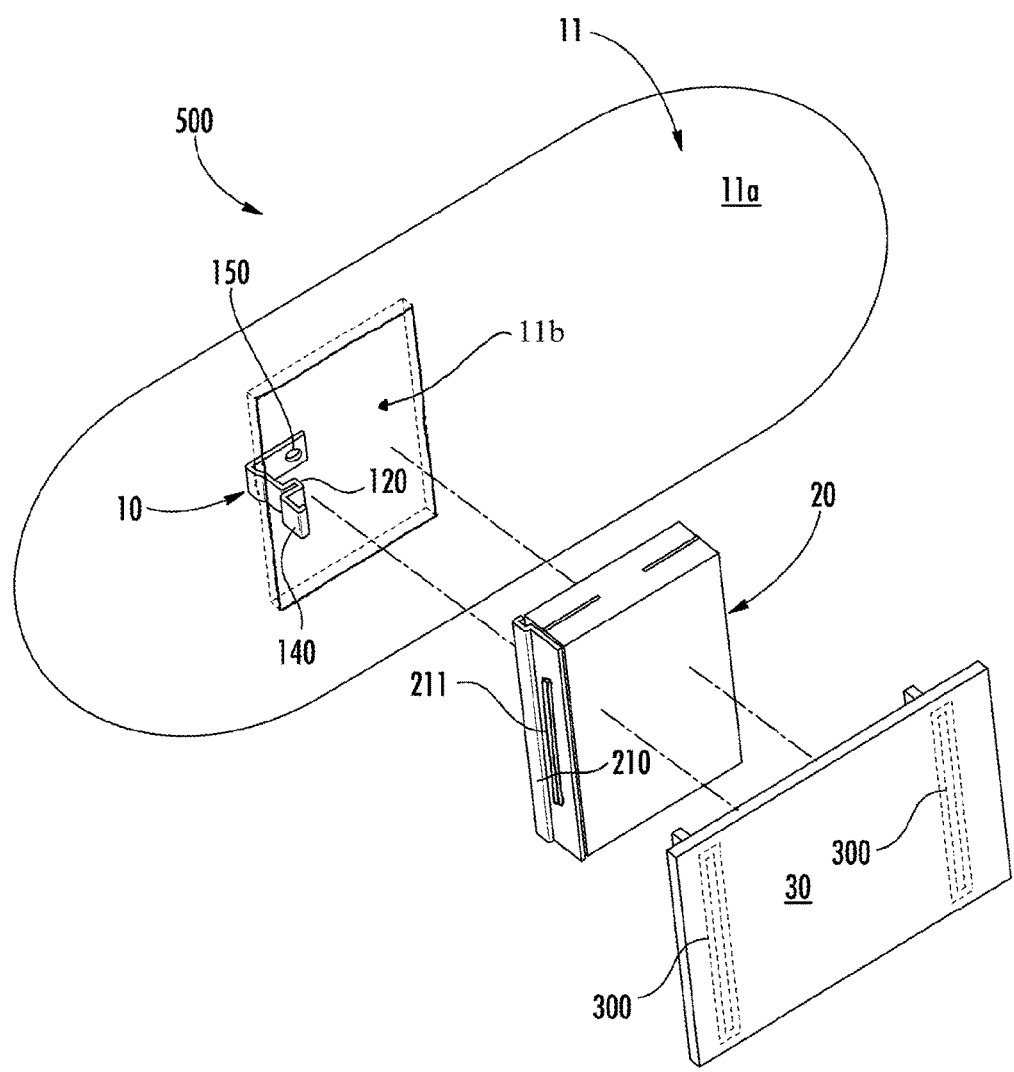
FIG. 5 is an exploded view of a device having the double locking battery latch assembly.

In an embodiment shown in FIG. 5, the battery cover 30 is positioned over the battery receiving space 11b, and has a shape complimentary to an opening forming the battery receiving space 11b on the device housing 11a. In the embodiments shown in FIGS. 2-5, the battery cover 30 has a blocking protrusion 300 positioned on an inner surface thereof. When the battery cover 30 is attached to the device housing 11a, the blocking protrusion 300 extends into the battery receiving space 11b.

As shown in the embodiments of FIGS. 2-4, when the battery 20 is retained in the battery receiving space 11b by the double locking battery latch 10, the blocking protrusion 300 is positioned adjacent to the second protruding catch 211. A portion of the cover contacting latch 140, such as the portion extending the second distance, is positioned between the blocking protrusion 300 and the second protruding catch 211. Thusly, when the battery cover 30 is positioned over the battery receiving space 11b, the free end 10b of the battery latch 10, including a portion of the cover contacting latch 140, is sandwiched between blocking protrusion 300 and the second protruding catch 211. When the device housing 11a is subject to a shock force, the free end 10b of the double locking battery latch 10 is prevented from being displaced away from the battery 20, and consequently unlatching the battery contacting latch 120 from the first protruding catch 210 and the cover contacting latch 140 from the second protruding latch 211. Instead, when the free end 10b is displaced outward away from the battery 20, the outward facing cover contacting surface 140b of the cover contacting latch 140 abuts against the blocking protrusion 300, preventing displacement of the free end 10b away from the battery 20.

In an embodiment, a battery latching method includes the steps of: providing the electronic device 11 having the battery receiving space 11b; positioning the double locking battery latch 10 in the battery receiving space 11b; positioning the battery 20 in the battery receiving space 11b; and engaging the battery contacting latch 120 with the first protruding catch 210 to secure the battery 20 in the battery receiving space 11b. In an embodiment, the battery latching method includes the step of engaging the cover contacting latch 140 with the second protruding catch 211 to secure the battery 20 in the battery receiving space 11b. In an embodiment, the battery latching method includes the step of positioning the battery cover 30 over the battery receiving space 11b, the battery cover 30 having the blocking protrusion 300 extending into the battery receiving space 11b, and the cover contacting latch 140 being positioned between the blocking protrusion 300 and the battery 20.

To supplement the present disclosure, this application incorporates entirely by reference the following commonly assigned patents, patent application publications, and patent applications:
U.S. Pat. Nos. 6,832,725; 7,128,266;
U.S. Pat. Nos. 7,159,783; 7,413,127; 7,726,575; 8,294,969; 8,317,105; 8,322,622; 8,366,005; 8,371,507; 8,376,233; U.S. Pat. No. 8,381,979; 8,390,909; 8,408,464; 8,408,468; U.S. Pat. No. 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;

U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221; U.S.
  Patent Application Publication No. 2010/0177080; U.S.
  Patent Application Publication No. 2010/0177076; U.S.
  Patent Application Publication No. 2010/0177707; U.S.
  Patent Application Publication No. 2010/0177749; U.S.
  Patent Application Publication No. 2010/0265880; U.S.
  Patent Application Publication No. 2011/0202554; U.S.
  Patent Application Publication No. 2012/0111946; U.S.
  Patent Application Publication No. 2012/0168511; U.S.
  Patent Application Publication No. 2012/0168512; U.S.
  Patent Application Publication No. 2012/0193423; U.S.
  Patent Application Publication No. 2012/0203647; U.S.
  Patent Application Publication No. 2012/0223141; U.S.
  Patent Application Publication No. 2012/0228382; U.S.
  Patent Application Publication No. 2012/0248188; U.S.
  Patent Application Publication No. 2013/0043312; U.S.
  Patent Application Publication No. 2013/0082104; U.S.
  Patent Application Publication No. 2013/0175341; U.S.
  Patent Application Publication No. 2013/0175343; U.S.
  Patent Application Publication No. 2013/0257744; U.S.
  Patent Application Publication No. 2013/0257759; U.S.
  Patent Application Publication No. 2013/0270346; U.S.
  Patent Application Publication No. 2013/0287258; U.S.
  Patent Application Publication No. 2013/0292475; U.S.
  Patent Application Publication No. 2013/0292477; U.S.
  Patent Application Publication No. 2013/0293539; U.S.
  Patent Application Publication No. 2013/0293540; U.S.
  Patent Application Publication No. 2013/0306728; U.S.
  Patent Application Publication No. 2013/0306731; U.S.
  Patent Application Publication No. 2013/0307964; U.S.
  Patent Application Publication No. 2013/0308625; U.S.
  Patent Application Publication No. 2013/0313324; U.S.
  Patent Application Publication No. 2013/0313325; U.S.
  Patent Application Publication No. 2013/0342717; U.S.
  Patent Application Publication No. 2014/0001267; U.S.
  Patent Application Publication No. 2014/0008439; U.S.
  Patent Application Publication No. 2014/0025584; U.S.
  Patent Application Publication No. 2014/0034734; U.S.
  Patent Application Publication No. 2014/0036848; U.S.
  Patent Application Publication No. 2014/0039693; U.S.
  Patent Application Publication No. 2014/0042814; U.S.
  Patent Application Publication No. 2014/0049120; U.S.
  Patent Application Publication No. 2014/0049635; U.S.
  Patent Application Publication No. 2014/0061306; U.S.
  Patent Application Publication No. 2014/0063289; U.S.
  Patent Application Publication No. 2014/0066136; U.S.
  Patent Application Publication No. 2014/0067692; U.S.
  Patent Application Publication No. 2014/0070005; U.S.
  Patent Application Publication No. 2014/0071840; U.S.
  Patent Application Publication No. 2014/0074746; U.S.
  Patent Application Publication No. 2014/0076974; U.S.
  Patent Application Publication No. 2014/0078341; U.S.
  Patent Application Publication No. 2014/0078345; U.S.
  Patent Application Publication No. 2014/0097249; U.S.
  Patent Application Publication No. 2014/0098792; U.S.
  Patent Application Publication No. 2014/0100813; U.S.
  Patent Application Publication No. 2014/0103115; U.S.
  Patent Application Publication No. 2014/0104413; U.S.
  Patent Application Publication No. 2014/0104414; U.S.
  Patent Application Publication No. 2014/0104416; U.S.
  Patent Application Publication No. 2014/0104451; U.S.
  Patent Application Publication No. 2014/0106594; U.S.
  Patent Application Publication No. 2014/0106725; U.S.
  Patent Application Publication No. 2014/0108010; U.S.
  Patent Application Publication No. 2014/0108402; U.S.
  Patent Application Publication No. 2014/0110485; U.S.
  Patent Application Publication No. 2014/0114530; U.S.
  Patent Application Publication No. 2014/0124577; U.S.
  Patent Application Publication No. 2014/0124579; U.S.
  Patent Application Publication No. 2014/0125842; U.S.
  Patent Application Publication No. 2014/0125853; U.S.
  Patent Application Publication No. 2014/0125999; U.S.
  Patent Application Publication No. 2014/0129378; U.S.
  Patent Application Publication No. 2014/0131438; U.S.
  Patent Application Publication No. 2014/0131441; U.S.
  Patent Application Publication No. 2014/0131443; U.S.
  Patent Application Publication No. 2014/0131444; U.S.
  Patent Application Publication No. 2014/0131445; U.S.
  Patent Application Publication No. 2014/0131448; U.S.
  Patent Application Publication No. 2014/0133379; U.S.
  Patent Application Publication No. 2014/0136208; U.S.
  Patent Application Publication No. 2014/0140585; U.S.
  Patent Application Publication No. 2014/0151453; U.S.
  Patent Application Publication No. 2014/0152882; U.S.
  Patent Application Publication No. 2014/0158770; U.S.
  Patent Application Publication No. 2014/0159869; U.S.
  Patent Application Publication No. 2014/0166755; U.S.
  Patent Application Publication No. 2014/0166759; U.S.
  Patent Application Publication No. 2014/0168787; U.S.
  Patent Application Publication No. 2014/0175165; U.S.
  Patent Application Publication No. 2014/0175172; U.S.
  Patent Application Publication No. 2014/0191644; U.S.
  Patent Application Publication No. 2014/0191913; U.S.
  Patent Application Publication No. 2014/0197238; U.S.

Patent Application Publication No. 2014/0197239; U.S.
Patent Application Publication No. 2014/0197304; U.S.
Patent Application Publication No. 2014/0214631; U.S.
Patent Application Publication No. 2014/0217166; U.S.
Patent Application Publication No. 2014/0217180; U.S.
Patent Application Publication No. 2014/0231500; U.S.
Patent Application Publication No. 2014/0232930; U.S.
Patent Application Publication No. 2014/0247315; U.S.
Patent Application Publication No. 2014/0263493; U.S.
Patent Application Publication No. 2014/0263645; U.S.
Patent Application Publication No. 2014/0267609; U.S.
Patent Application Publication No. 2014/0270196; U.S.
Patent Application Publication No. 2014/0270229; U.S.
Patent Application Publication No. 2014/0278387; U.S.
Patent Application Publication No. 2014/0278391; U.S.
Patent Application Publication No. 2014/0282210; U.S.
Patent Application Publication No. 2014/0284384; U.S.
Patent Application Publication No. 2014/0288933; U.S.
Patent Application Publication No. 2014/0297058; U.S.
Patent Application Publication No. 2014/0299665; U.S.
Patent Application Publication No. 2014/0312121; U.S.
Patent Application Publication No. 2014/0319220; U.S.
Patent Application Publication No. 2014/0319221; U.S.
Patent Application Publication No. 2014/0326787; U.S.
Patent Application Publication No. 2014/0332590; U.S.
Patent Application Publication No. 2014/0344943; U.S.
Patent Application Publication No. 2014/0346233; U.S.
Patent Application Publication No. 2014/0351317; U.S.
Patent Application Publication No. 2014/0353373; U.S.
Patent Application Publication No. 2014/0361073; U.S.
Patent Application Publication No. 2014/0361082; U.S.
Patent Application Publication No. 2014/0362184; U.S.
Patent Application Publication No. 2014/0363015; U.S.
Patent Application Publication No. 2014/0369511; U.S.
Patent Application Publication No. 2014/0374483; U.S.
Patent Application Publication No. 2014/0374485; U.S.
Patent Application Publication No. 2015/0001301; U.S.
Patent Application Publication No. 2015/0001304; U.S.
Patent Application Publication No. 2015/0003673; U.S.
Patent Application Publication No. 2015/0009338; U.S.
Patent Application Publication No. 2015/0009610; U.S.
Patent Application Publication No. 2015/0014416; U.S.
Patent Application Publication No. 2015/0021397; U.S.
Patent Application Publication No. 2015/0028102; U.S.
Patent Application Publication No. 2015/0028103; U.S.
Patent Application Publication No. 2015/0028104; U.S.
Patent Application Publication No. 2015/0029002; U.S.
Patent Application Publication No. 2015/0032709; U.S.
Patent Application Publication No. 2015/0039309; U.S.
Patent Application Publication No. 2015/0039878; U.S.
Patent Application Publication No. 2015/0040378; U.S.
Patent Application Publication No. 2015/0048168; U.S.
Patent Application Publication No. 2015/0049347; U.S.
Patent Application Publication No. 2015/0051992; U.S.
Patent Application Publication No. 2015/0053766; U.S.
Patent Application Publication No. 2015/0053768; U.S.
Patent Application Publication No. 2015/0053769; U.S.
Patent Application Publication No. 2015/0060544; U.S.
Patent Application Publication No. 2015/0062366; U.S.
Patent Application Publication No. 2015/0063215; U.S.
Patent Application Publication No. 2015/0063676; U.S.
Patent Application Publication No. 2015/0069130; U.S.
Patent Application Publication No. 2015/0071819; U.S.
Patent Application Publication No. 2015/0083800; U.S.
Patent Application Publication No. 2015/0086114; U.S.
Patent Application Publication No. 2015/0088522; U.S.
Patent Application Publication No. 2015/0096872; U.S.
Patent Application Publication No. 2015/0099557; U.S.
Patent Application Publication No. 2015/0100196; U.S.
Patent Application Publication No. 2015/0102109; U.S.
Patent Application Publication No. 2015/0115035; U.S.
Patent Application Publication No. 2015/0127791; U.S.
Patent Application Publication No. 2015/0128116; U.S.
Patent Application Publication No. 2015/0129659; U.S.
Patent Application Publication No. 2015/0133047; U.S.
Patent Application Publication No. 2015/0134470; U.S.
Patent Application Publication No. 2015/0136851; U.S.
Patent Application Publication No. 2015/0136854; U.S.
Patent Application Publication No. 2015/0142492; U.S.
Patent Application Publication No. 2015/0144692; U.S.
Patent Application Publication No. 2015/0144698; U.S.
Patent Application Publication No. 2015/0144701; U.S.
Patent Application Publication No. 2015/0149946; U.S.
Patent Application Publication No. 2015/0161429; U.S.
Patent Application Publication No. 2015/0169925; U.S.
Patent Application Publication No. 2015/0169929; U.S.
Patent Application Publication No. 2015/0178523; U.S.
Patent Application Publication No. 2015/0178534; U.S.
Patent Application Publication No. 2015/0178535; U.S.
Patent Application Publication No. 2015/0178536; U.S.
Patent Application Publication No. 2015/0178537; U.S.
Patent Application Publication No. 2015/0181093; U.S.
Patent Application Publication No. 2015/0181109;

U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/458,405 for an Electronic Device, filed Jun. 19, 2013 (Fitch et al.);

U.S. patent application Ser. No. 29/459,620 for an Electronic Device Enclosure, filed Jul. 2, 2013 (London et al.);

U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HANDHELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation. The use of the terms "first," "second," "third," etc. are used as labels, and are not intended to impose numerical requirements upon their subjects, unless clearly stated. Furthermore, references to "an embodiment" or "another embodiment" are not intended to be interpreted as excluding the existence of additional embodiments that also incorporate the recited features. Moreover, unless explicitly stated otherwise, embodiments "comprising," "including," or "having" an element or plurality of elements having a particular property may include additional elements not having that property.

The invention claimed is:

1. An electronic device, comprising:
a device housing having a battery receiving space;
a battery positioned in the battery receiving space;
a cover positioned over the battery in the battery receiving space, the cover comprising a blocking protrusion extending into the battery receiving space; and
a latch comprising:
a fixed end having a fastening portion connected to the device housing;
a free end opposite the fixed end having a cover contacting latch positioned between the battery and the blocking protrusion; and
a battery contacting latch positioned between the fastening portion and the cover contacting latch.

2. The electronic device of claim 1, wherein the fastening portion extends approximately in a first plane.

3. The electronic device of claim 2, comprising a first transition extending continuously from the fastening portion to the battery contacting latch.

4. The electronic device of claim 3, wherein the first transition bends from the fastening portion and extends approximately in a second plane that is orthogonal to the first plane.

5. The electronic device of claim 4, wherein the battery contacting latch bends from the first transition and extends in a third plane that is approximately parallel to the first plane.

6. The electronic device of claim 5, wherein:
the fastening portion has a battery facing surface; and
the battery contacting latch has an opposing first catch contacting surface facing the battery surface.

7. The electronic device of claim 6, comprising a second transition extending continuously from the battery contacting latch to the cover contacting latch.

8. The electronic device of claim 7, wherein the second transition bends from the battery contacting latch and extends away from the fastening portion.

9. The electronic device of claim 8, wherein the cover contacting latch bends from the second transition to define a first member that extends in a fourth plane that is approximately parallel to the first and third planes.

10. The electronic device of claim 9, wherein the cover contacting latch bends to extend in a fifth plane that is approximately parallel to the second plane.

11. The electronic device of claim 10, wherein the cover contacting latch is approximately L-shaped.

12. The electronic device of claim 1, wherein the fastening portion has a fastener receiving passageway.

13. The electronic device of claim 12, wherein the fastener receiving passageway is substantially cylindrical and extends approximately perpendicular to the fastening portion.

14. The electronic device of claim 13, wherein the fastener receiving passageway has a threaded inner surface.

15. An electronic device, comprising:
a device housing having a battery receiving space;
a battery positioned in the battery receiving space;
a cover positioned over the battery in the battery receiving space, the cover comprising a blocking protrusion extending into the battery receiving space; and
a double locking battery latch positioned in the battery receiving space and comprising:
a fixed end with a fastening portion connected to the device housing;
a free end opposite the fixed end having a cover contacting latch positioned between the battery and the blocking protrusion; and
a battery contacting latch positioned between the fastening portion and the cover contacting latch.

16. The electronic device of claim 15, wherein the battery comprises a protruding catch engaged with the battery contacting latch.

17. The electronic device of claim 16, wherein the cover contacting latch is approximately L-shaped.

18. The electronic device of claim 17, wherein the cover contacting latch has a cover contacting surface in contact with the blocking protrusion.

19. A battery latching method, comprising:
connecting a double locking battery latch to a device housing having a battery receiving space, the battery latch comprising:
a fixed end with a fastening portion connected to the device housing;

a free end opposite the fixed end with a cover contacting latch; and
a battery contacting latch positioned between the fastening portion and the cover contacting latch;

positioning a battery in the battery receiving space, the battery having a protruding catch;

engaging the battery contacting latch with the protruding catch;

positioning a cover comprising a blocking protrusion over the battery in the battery receiving space, the blocking protrusion extending into the battery receiving space; and positioning the cover contacting latch between the battery and the blocking protrusion.

20. The battery latching method of claim 19, comprising connecting the double locking batter latch to the device housing by inserting a fastener through the fastening portion and securing the fastener to the device housing.

* * * * *